(12) United States Patent
Nakajima et al.

(10) Patent No.: US 7,501,736 B2
(45) Date of Patent: Mar. 10, 2009

(54) MINIATURE MOTOR

(75) Inventors: Fumio Nakajima, Kanagawa (JP);
Toshihiro Negishi, Kanagawa (JP);
Masahiro Uehara, Kanagawa (JP)

(73) Assignee: Mitsuba Corporation, Kiryu-shi, Gunma-ken (JP)

( * ) Notice: Subject to any disclaimer, the term of this patent is extended or adjusted under 35 U.S.C. 154(b) by 365 days.

(21) Appl. No.: 11/341,528

(22) Filed: Jan. 30, 2006

(65) Prior Publication Data
US 2006/0170296 A1 Aug. 3, 2006

(30) Foreign Application Priority Data
Jan. 31, 2005 (JP) ............... P.2005-022999

(51) Int. Cl.
*H02K 5/14* (2006.01)
(52) U.S. Cl. .................... 310/239; 310/245
(58) Field of Classification Search .......... 310/43, 310/239, 245, 242
See application file for complete search history.

(56) References Cited

U.S. PATENT DOCUMENTS

| 3,212,041 | A | 10/1965 | Dixon |
| 4,590,398 | A | 5/1986 | Nagamatsu |
| 4,855,631 | A * | 8/1989 | Sato et al. ............ 310/239 |
| 5,939,812 | A * | 8/1999 | Wetzel ................ 310/245 |
| 6,005,323 | A * | 12/1999 | Morimoto et al. ...... 310/239 |
| 6,608,423 | B2 * | 8/2003 | Tam ................... 310/239 |

FOREIGN PATENT DOCUMENTS

| EP | 1 124 306 A2 | 8/2001 |
| EP | 1 251 604 A2 | 10/2002 |
| EP | 1 351 368 A1 | 10/2003 |
| GB | 2118784 A * | 11/1983 |
| JP | 2002-159154 | 5/2002 |

* cited by examiner

*Primary Examiner*—Tran N Nguyen
(74) *Attorney, Agent, or Firm*—McGinn IP Law Group, PLLC

(57) ABSTRACT

A miniature motor 1 includes: a motor case 2; a gear case 5 connected to the motor case 2, for pivotally supporting an output shaft 15; a brush holder 30, 30' for holding a brush 17 and attached to the gear case 5; and a brush holder attaching portion 7, 7', which is formed into a recess-shape, into which the brush holder is press-fitted in the axial direction of the output shaft, the brush holder attaching portion being formed integrally with the gear case.

20 Claims, 26 Drawing Sheets

MINIATURE MOTOR

The present application claims foreign priority under 35 USC 119 based on Japanese Patent Application No. 2005-022999, filed on Jan. 31, 2005, the contents of which is incorporated herein by reference in its entirety, and concurrently with the filing of this U.S. patent application.

BACKGROUND OF THE INVENTION

The present invention relates to a miniature motor in which a brush holder for holding a brush is directly attached to a brush holder attaching portion arranged in a gear case.

Concerning this type miniature motor, the miniature motor having a reduction gear mechanism shown in FIGS. 19 to 28 is provided. (For example, refer to Patent Document 1.)

As shown in FIGS. 19 to 21, this miniature motor 1 includes: a yoke (motor case) 2 made of metal, the shape of which is substantially cylindrical, one end side of which is open; and a gear case 5 made of synthetic resin which is fastened and fixed to a flange portion 2b, which is formed round an opening end 2a of the yoke 2, via the screws 2e.

As shown in FIG. 19, a pair of magnets 3, 3 are bonded onto the inner circumferential face 2c of the yoke 2 with adhesive. The armature shaft 11 is pivotally supported by the bearing 4a which is engaged with the cylindrical portion 2d having a bottom portion arranged at the other end of the yoke 2, and by the bearings 4b, 4c engaged with the neighborhoods of both end portions of the shaft hole 6 of the gear case 5.

The worm 12 is formed in the neighborhood of the forward end portion 11a of the armature shaft 11. The armature 10 is attached to a position on the armature shaft 11 opposing to a pair of magnets 3, 3. This armature 10 is fixed to the neighborhood of the base end portion 11b of the armature shaft 11. The armature 10 includes: an armature core 10a having a coil winding portion, the number of the slots of which is predetermined; and an armature coil 10b wound round the coil winding portion of this armature core 10a.

The commutator 13 is fixed at a position on the armature shaft 11 opposing to the boundary portion with the yoke 2 and the gear case 5. This commutator 13 has commutator pieces 13a, the number of which is the same as that of the coil winding portions of the armature core 10a. Each commutator piece 13a of the commutator 13 and the armature coil 10b of the armature 10 are electrically connected to each other. An opening end portion of the shaft hole 6 of the gear case 5 is formed into the large diameter hole portion 6a. At the position of this large diameter hole portion 6a opposing to the commutator 13, a pair of brush holder attaching portions 7, 7' are integrally formed. The shape of each brush holder attaching portion is formed into a recess shape. In these brush holder attaching portions 7, 7' and the cutout portions 8, 8', the brush holders 20, 20', which are made of metal such as brass, for holding the brush 17 are attached by means of press-fitting.

As shown in FIGS. 19 and 20, in the shaft hole 6 of the gear case 5, the recess-shaped reduction gear mechanism housing portion 9 is formed so that it can be communicated with the shaft hole 6. In this recess-shaped reduction gear mechanism housing portion 9, the wheel gear 14, which is meshed with the worm 12 of the armature shaft 11, is pivotally supported via the bearing 16. The worm 12 and the wheel gear 14 form the reduction gear mechanism S. The output shaft 15 is integrally protruded from the center of the wheel gear 14. This output shaft 15 is protruded outside from the gear case 5.

As shown in FIGS. 19 and 21 to 25, one brush holder 20 of the pair of brush holders 20, 20' includes: a brush box portion 20a made of metal such as brass for housing the brush 17; a first connecting terminal piece portion 20b, which is formed being vertically bent at the upper center of the brush box portion 20a, connected with the pigtail 18 formed integrally with the brush 17; and a second connecting terminal piece portion 20c, which is formed being bent at one side end of the brush box portion 20a so that it can cover the rear side opening portion of the brush box portion 20a.

The brush box portion 20a of one brush holder 20 is press-fitted into the recess-shaped brush holder attaching portion 7 of the gear case 5, and the second connecting terminal piece 20c of the brush holder 20 is press-fitted into the cutout portion 8. In this case, the forward end portion 20d, which is vertically bent, of the second connecting terminal piece portion 20c is connected to the control circuit on the circuit board not shown in the drawing.

As shown in FIGS. 19, 21, 22 and 26 to 28, the other brush holder 20' of the pair of brush holders 20, 20' includes: a brush box portion 20a made of metal such as brass for housing the brush 17; a first connecting terminal piece portion 20b, which is vertically bent at the center of the upper portion of this brush box portion 20a, connected with the pigtail 18 formed integrally with the brush 17; and a second connecting terminal piece portion 20c' which is formed being bent at one side end of the brush box portion 20a so that it can cover the rear side opening portion of the brush box portion 20a. The second connecting terminal piece portion 20c' of the other brush holder 20' is shorter than the second connecting terminal piece portion 20c of one brush holder 20.

The brush box portion 20a of the other brush holder 20' is press-fitted into the recess-shaped brush holder attaching portion 7' of the gear case 5, and the second connecting terminal piece portion 20c' of the other brush holder 20' is press fitted into the cutout portion 8'. In this case, the forward end portion 20d of the second connecting terminal piece portion 20c' is connected to the control circuit on the circuit board not shown.

Each brush 17, which is exposed outside from the front side opening portion of each brush box portion 20a of the pair of brush holders 20, 20', is pushed by the compressive coil spring 19 so that the brush 17 can be contacted with the commutator 13. As described before, each brush 17 is electrically connected to the control circuit on the circuit board not shown via each forward end portion 20d of the second connecting terminal piece portion 20c, 20c' of each brush holder 20, 20'. When each switch of the pair of switches of this control circuit is switched from OFF to ON, an electric current flows in the armature 10 and others, so that the armature shaft 11 can be rotated normally and reversely.

[Patent Document 1]

JP-A-2002-159154

However, in the conventional miniature motor 1 described above, the entire brush holder 20, 20' for holding the brush 17 is made of metal such as brass. Accordingly, the weight of the miniature motor 1 is increased and further the manufacturing cost is raised. Furthermore, the brush 17 coming into contact with the commutator 13 arranged on the rotating armature shaft 11 vibrates in the brush box 20a of each brush holder 20, 20' made of metal. Accordingly, operational noise tends to be generated.

SUMMARY OF THE INVENTION

The present invention is accomplished to solve the above problems. An object of the present invention is to provide a miniature motor, the weight of which can be reduced and the manufacturing cost of which can be decreased, capable of positively preventing the generation of operational noise.

The invention according to aspect 1 is to provide a miniature motor including: a motor case in which an armature rotated by energizing is housed; a gear case connected to the motor case, for pivotally supporting an output shaft to which a rotation of the armature is transmitted via a reduction gear mechanism; a brush holder for holding a brush to energize a commutator attached to an armature shaft of the armature, attached to the gear case; and a brush holder attaching portion, which is formed into a recess-shape, into which the brush holder is press-fitted in the axial direction of the output shaft, the brush holder attaching portion being formed integrally with the gear case, the brush holder including: a substantially box-shaped brush holder body made of synthetic resin for housing the brush, the brush holder body being press-fitted into the brush holder attaching portion which is formed into a recess-shape; and a metallic-plate-shaped connecting terminal detachably attached to the brush holder body so that the connecting terminal can cover a rear opening portion of the brush holder body and connected with a pigtail formed integrally with the brush, wherein a protrusion used for press-fitting into the brush holder attaching portion is integrally formed on each of the pair of side walls of the brush holder body which are opposed to each other.

The invention according to aspect 2 is to provide a miniature motor according to aspect 1, wherein the protrusion used for press-fitting into the brush holder attaching portion is integrally formed on each outer face of the pair of side walls of the brush holder body, which are opposed to each other, on an upper side of the brush, and a slit is formed on the lower side of the protrusion of each of the side walls.

The invention according to aspect 3 is to provide a miniature motor according to aspect 1, wherein an engaging protrusion is integrally formed on each inner face of the pair of side walls of the brush holder body which are opposed to each other, and a hook portion engaged with each engaging protrusion is formed in the connecting terminal opposed to each engaging protrusion.

The invention according to aspect 4 is to provide a miniature motor according to aspect 1, wherein an extending portion extending outside with respect to the brush holder body is provided in one side portion of the connecting terminal, the extending portion can be freely inserted into a cutout portion provided in the brush holder attaching portion which is formed into a recess shape, and a protrusion used for press-fitting into the cutout portion is formed at a position opposing to the cutout portion in the extending portion.

As explained above, according to the invention described in aspect 1, the brush holder includes: a substantially box-shaped brush holder body made of synthetic resin for housing the brush, the brush holder body being press-fitted into the brush holder attaching portion which is formed into a recess-shape; and a metallic-plate-shaped connecting terminal detachably attached to the brush holder body so that the connecting terminal can cover a rear opening portion of the brush holder body and connected with a pigtail formed integrally with the brush, wherein a protrusion used for press-fitting into the brush holder attaching portion is integrally formed on each of the pair of side walls of the brush holder body which are opposed to each other. Due to the above structure, the substantially box-shaped brush holder body made of resin can be positively and simply attached into the recess-shaped brush holder attaching portion of the gear case via each portion on the pair of side walls of the brush holder body without causing any rattling Therefore, the generation of operational noise can be positively prevented. The brush holder is formed being divided into the substantially box-shaped brush holder body made of synthetic resin and the metallic-plate-shaped connecting terminal attached to the rear side opening portion of the brush holder body. Therefore, as compared with the conventional brush holder which is entirely made of metal, the weight of the entire miniature motor can be reduced and the manufacturing cost can be lowered.

According to the invention described in aspect 2, the protrusion used for press-fitting into the brush holder attaching portion is integrally formed on each outer face of the pair of side walls of the brush holder body, which are opposed to each other, on an upper side of the brush, and a slit is formed on the lower side of the protrusion of each of the side walls. Due to the above structure, the brush holder body can be positively press-fitted and simply attached into the recess-shaped brush holder attaching portion. Deformation of the brush holder body generated at the time of press-fitting can be absorbed by the slit. Accordingly, there is no possibility that an excessively heavy load is given to the brush housed in the brush holder body.

According to the invention described in aspect 3, an engaging protrusion is integrally formed on each inner face of the pair of side walls of the brush holder body which are opposed to each other, and a hook portion engaged with each engaging protrusion is formed in the connecting terminal opposed to each engaging protrusion. Therefore, the connecting terminal can be simply and positively attached to between a pair of side walls of the brush holder body.

According to the invention described in aspect 4, an extending portion extending outside with respect to the brush holder body is provided in one side portion of the connecting terminal, the extending portion can be freely inserted into a cutout portion provided in the brush holder attaching portion which is formed into a recess shape, and a protrusion used for press-fitting into the cutout portion is formed at a position opposing to the cutout portion in the extending portion. Due to the above structure, the extending portion of the connecting terminal can be press-fitted into the cutout portion without causing any rattling, and the generation of vibration can be positively prevented.

DETAILED DESCRIPTION OF THE PREFERRED EMBODIMENTS

Figure 1:
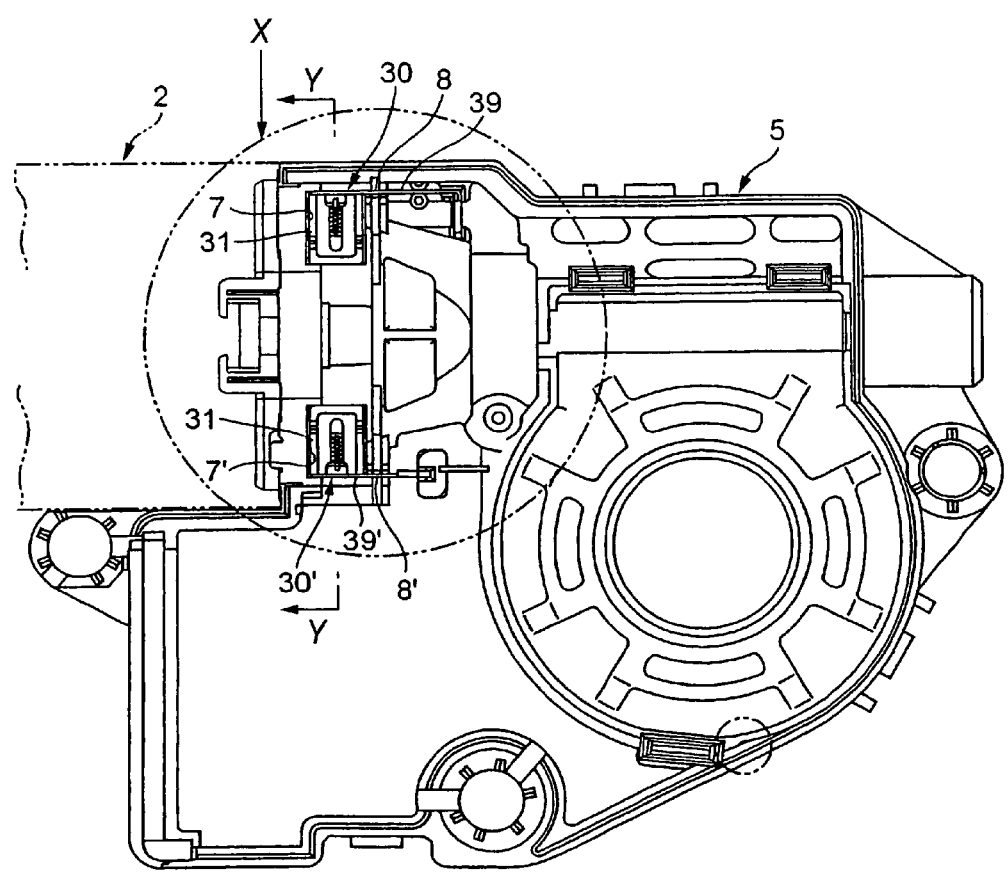
FIG. 1 is a plan view showing a gear case of a miniature motor of an embodiment of the present invention.

Referring to the drawings, an embodiment of the present invention will be explained as follows.

Figure 2:
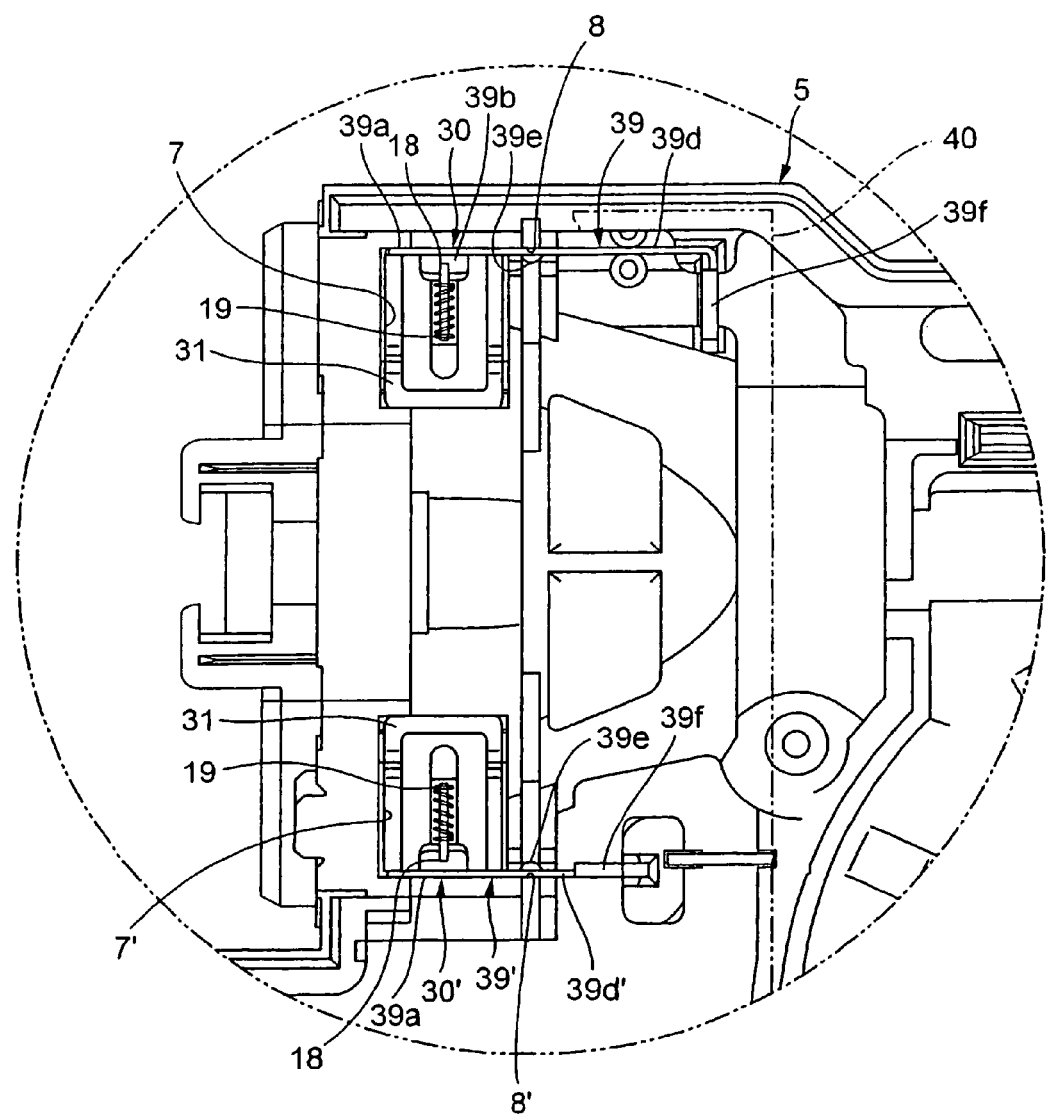
FIG. 2 is an enlarged plan view of the portion X in FIG. 1.
Figure 3:
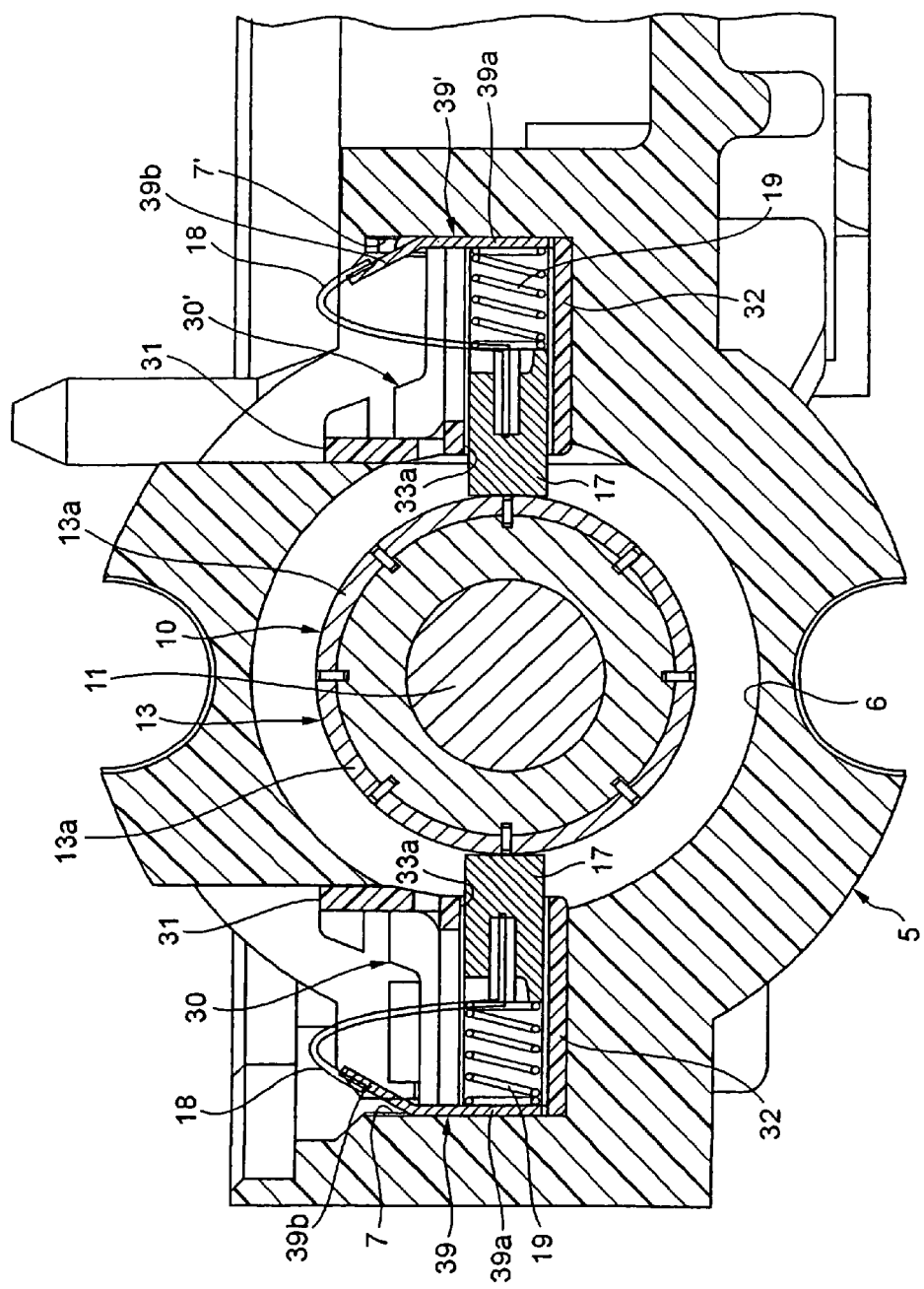
FIG. 3 is a sectional view taken on line Y-Y in FIG. 1.
Figure 4A:
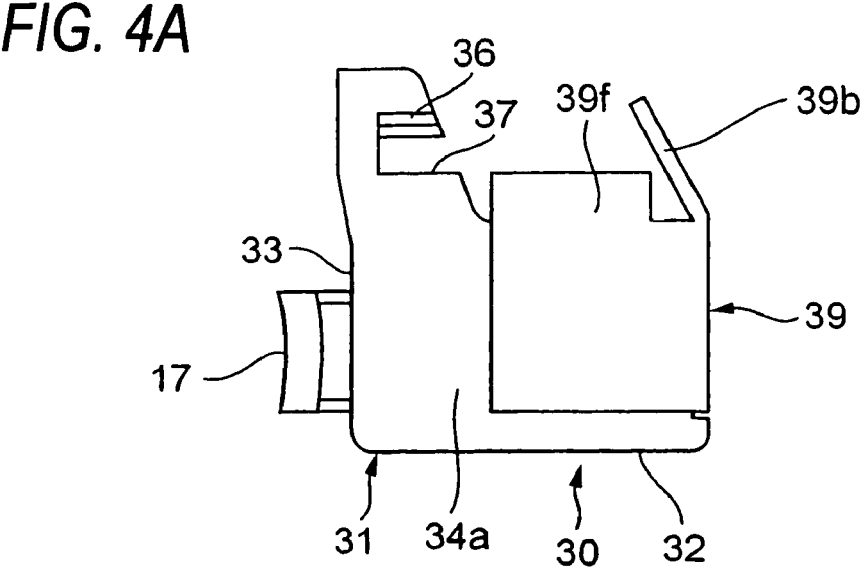
FIG. 4A is a left side view showing a state in which a brush of one brush holder used for the miniature motor is held and FIG. 4B is a plan view showing a state in which the brush of one brush holder is held.
Figure 4B:
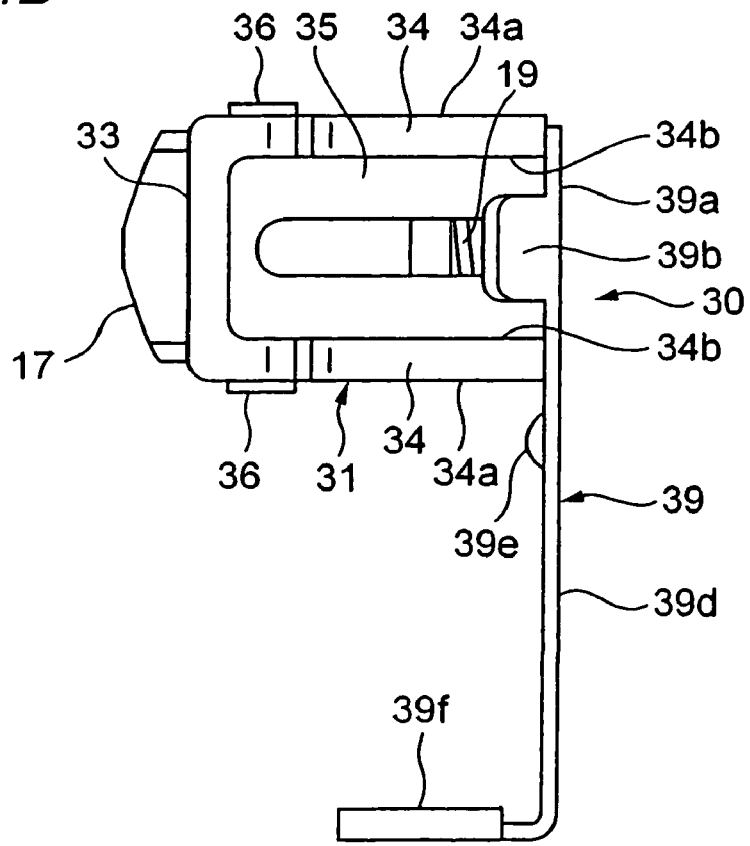
Figure 5A:
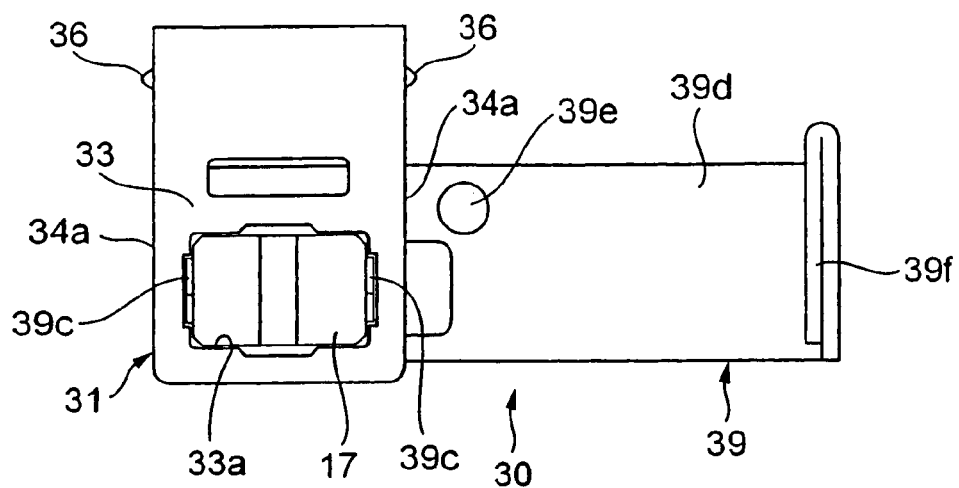
FIG. 5A is a front view showing a state in which the brush of one brush holder is held and FIG. 5B is a rear view showing a state in which the brush of one brush holder is held.
Figure 5B:
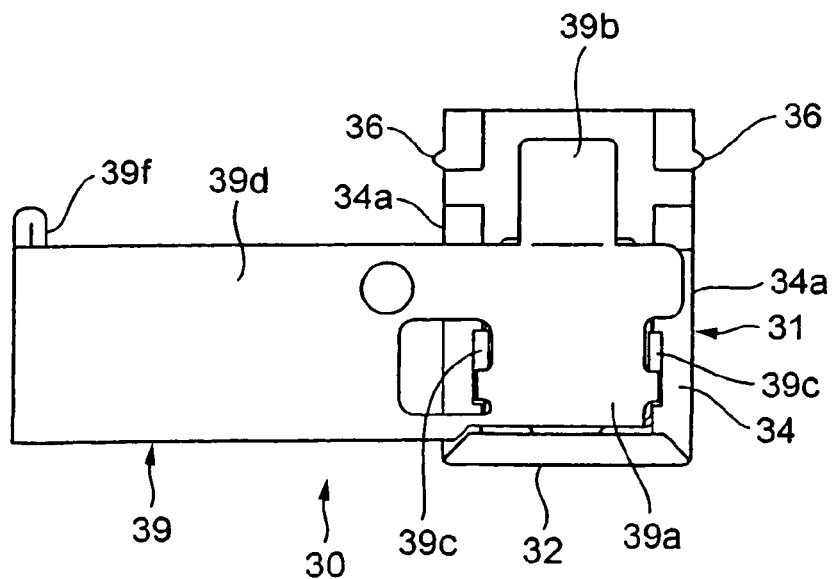
Figure 6A:
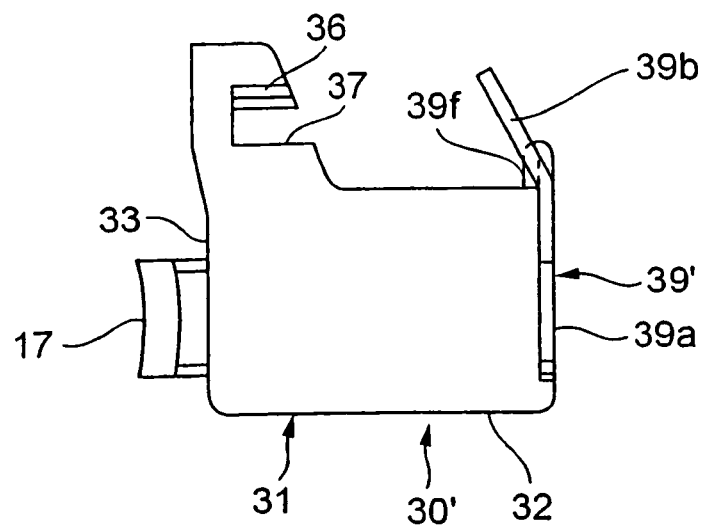
FIG. 6A is a left side view showing a state in which a brush of the other brush holder used for the miniature motor is held and FIG. 6B is a plan view showing a state in which the brush of the other brush holder is held.
Figure 6B:
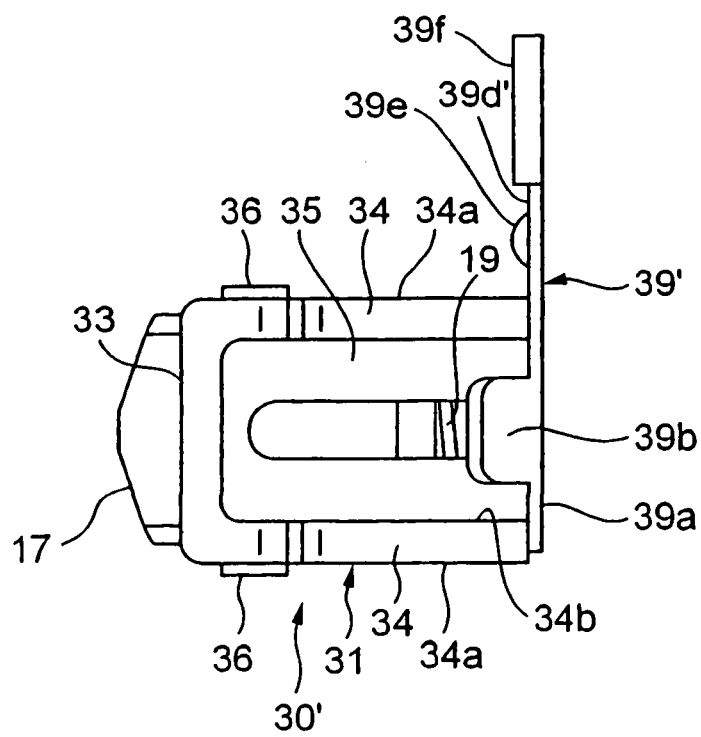
Figure 7A:
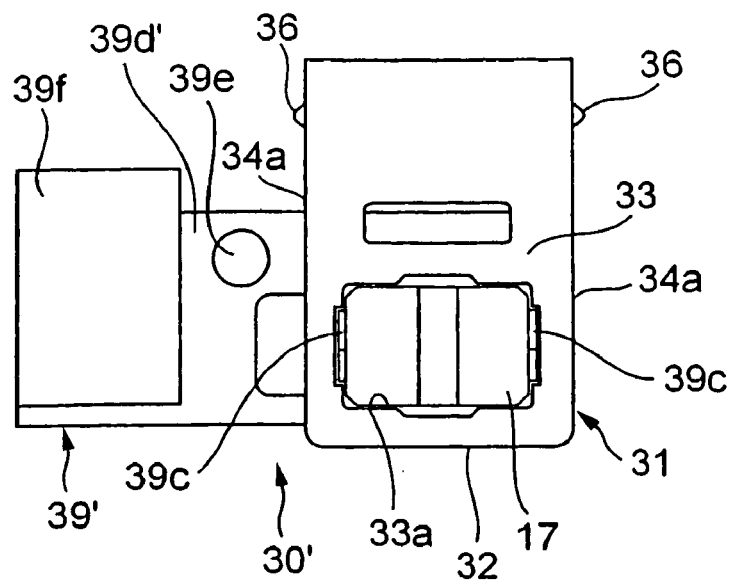
FIG. 7A is a front view showing a state in which the brush of the other brush holder is held and FIG. 7B is a rear view showing a state in which the brush of the other brush holder is held.
Figure 7B:
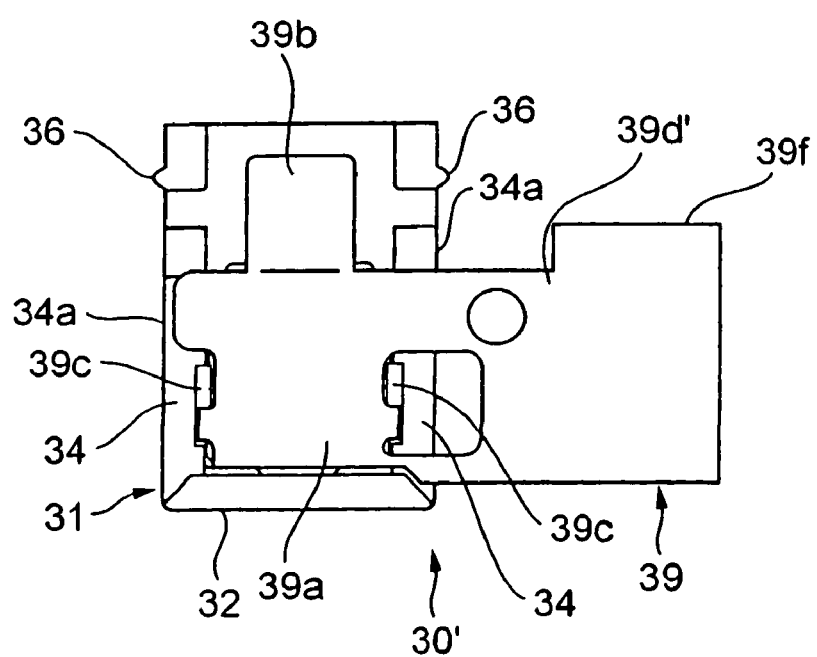
Figure 8A:
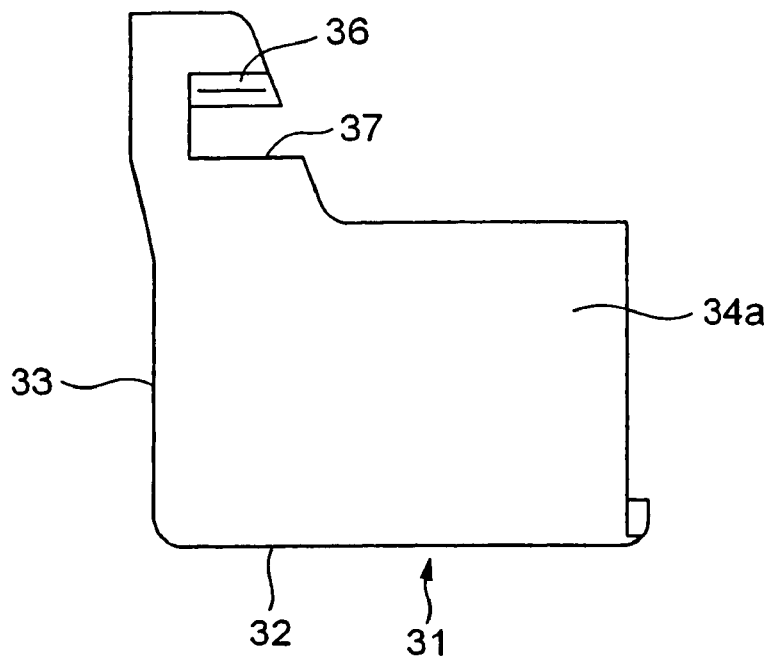
FIG. 8A is a left side view showing a brush holder body of the brush holder and FIG. 8B is a plan view showing the brush holder body.
Figure 8B:
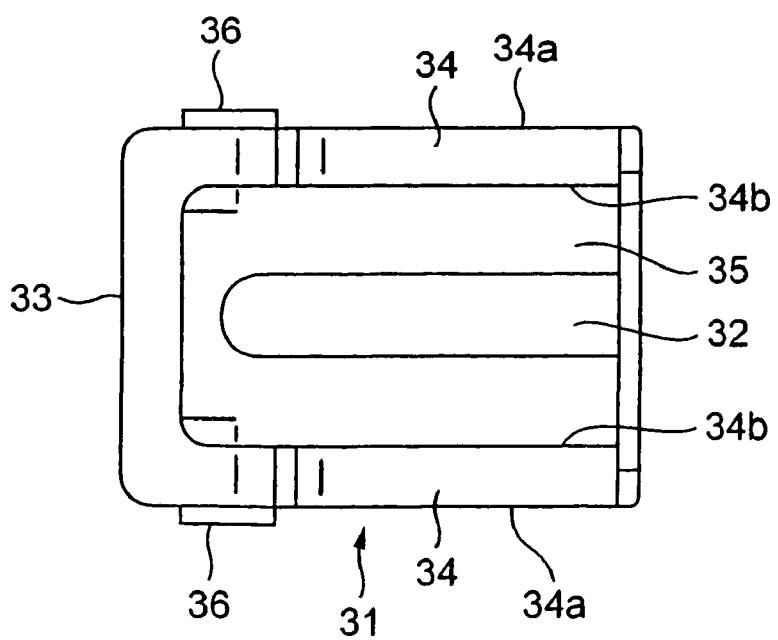
Figure 9A:
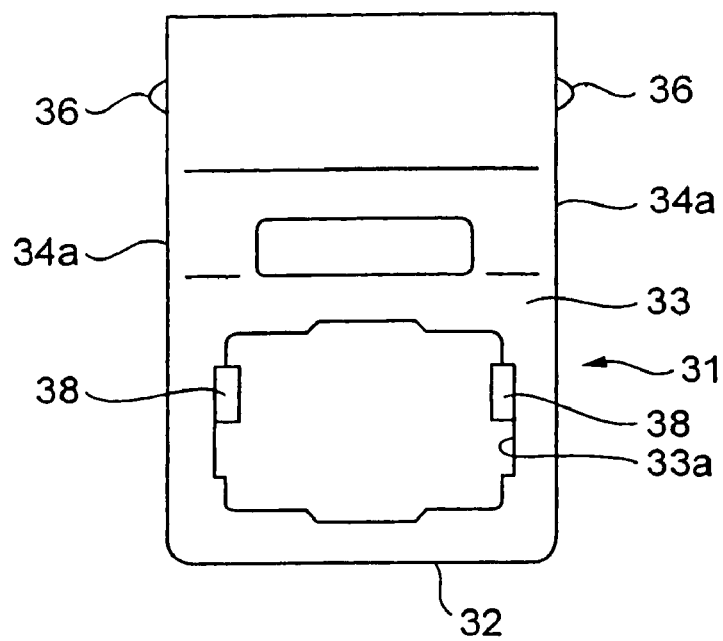
FIG. 9A is a front view showing the brush holder body and FIG. 9B is a rear view showing the brush holder body.
Figure 9B:
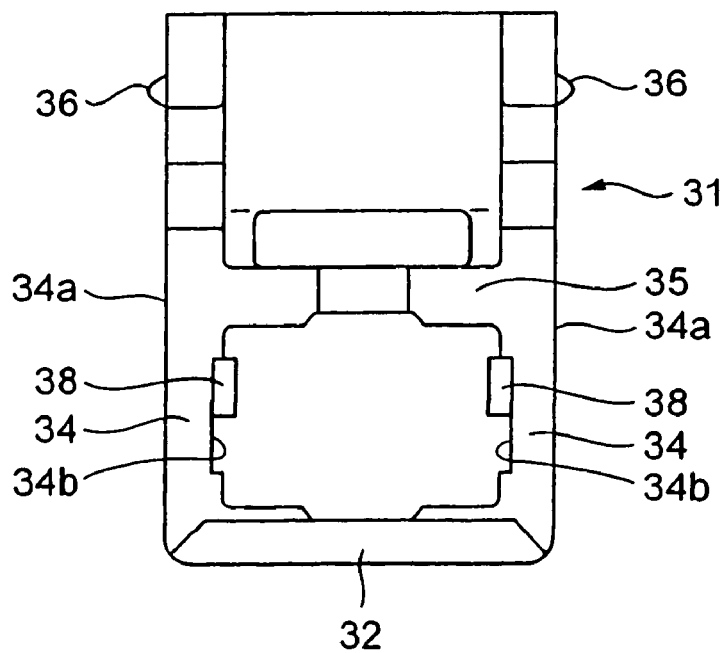
Figure 10A:
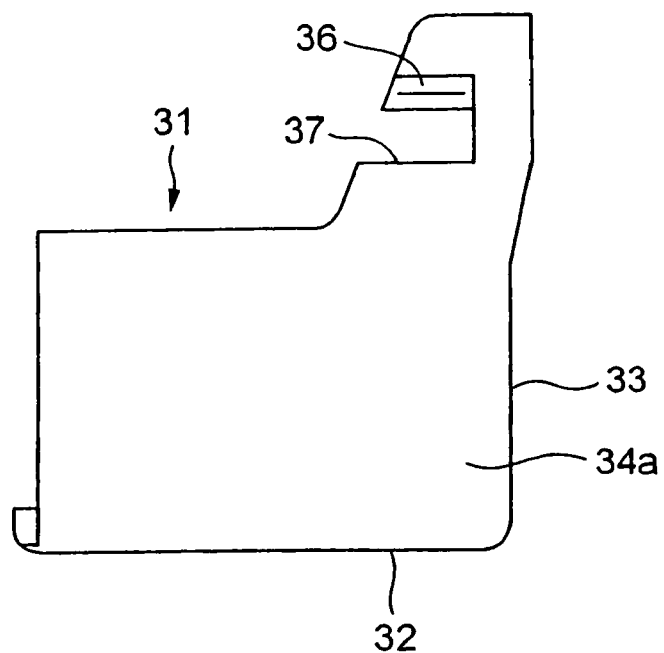
FIG. 10A is a right side view showing the brush holder body and FIG. 10B is a bottom face view showing the brush holder body.
Figure 10B:
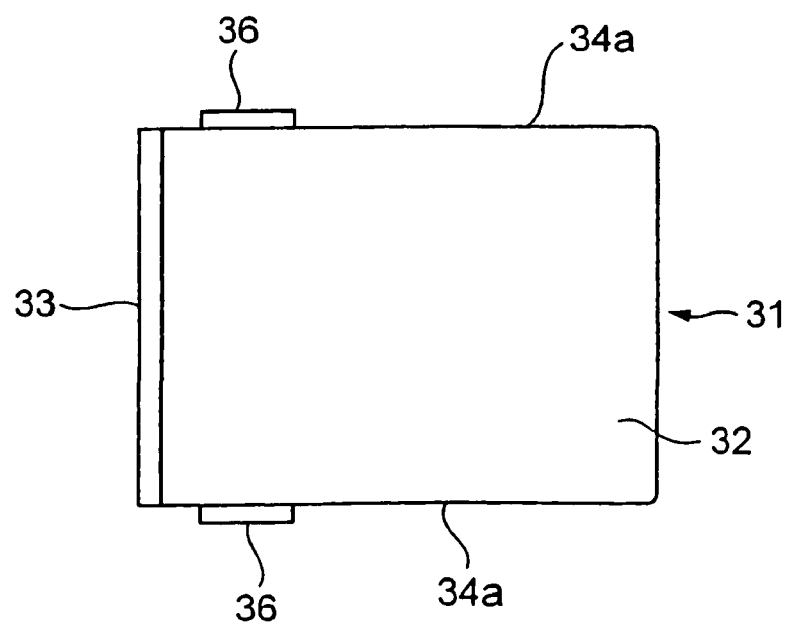
Figure 11A:
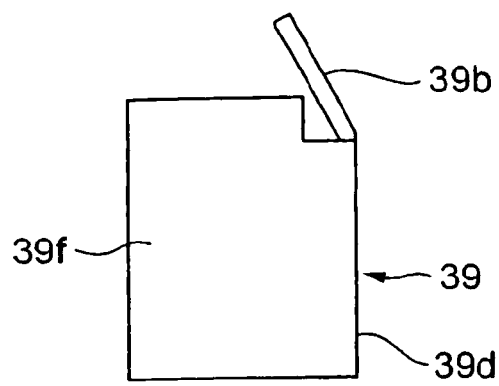
FIG. 11A is a left side view showing a connecting terminal of one brush holder and FIG. 11B is a plan view showing the connecting terminal of one brush holder.
Figure 11B:
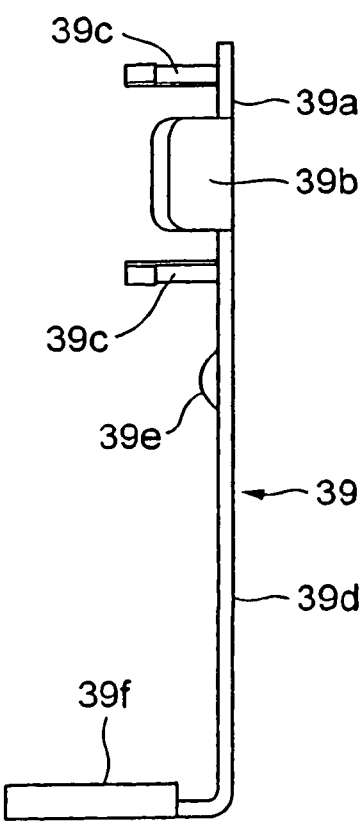
Figure 12A:
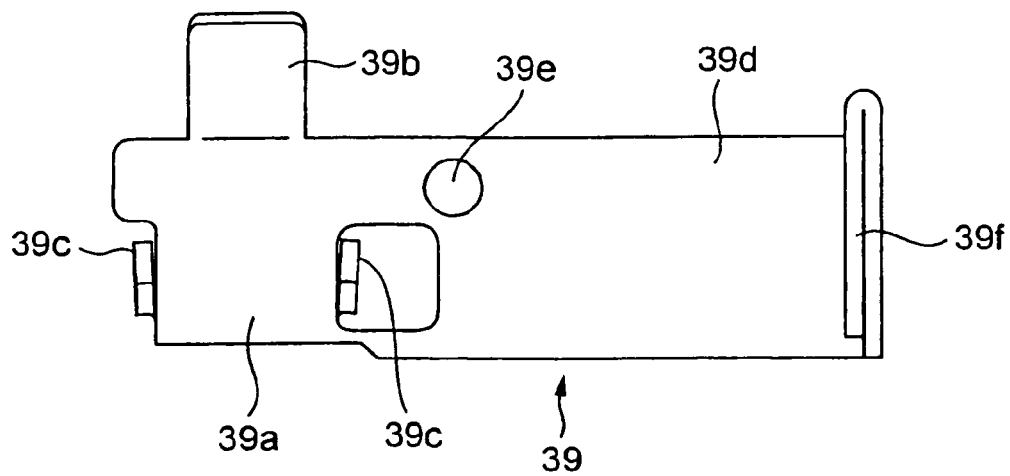
FIG. 12A is a front view showing the connecting terminal of one brush holder and FIG. 12B is a rear view showing the connecting terminal of one brush holder.
Figure 12B:
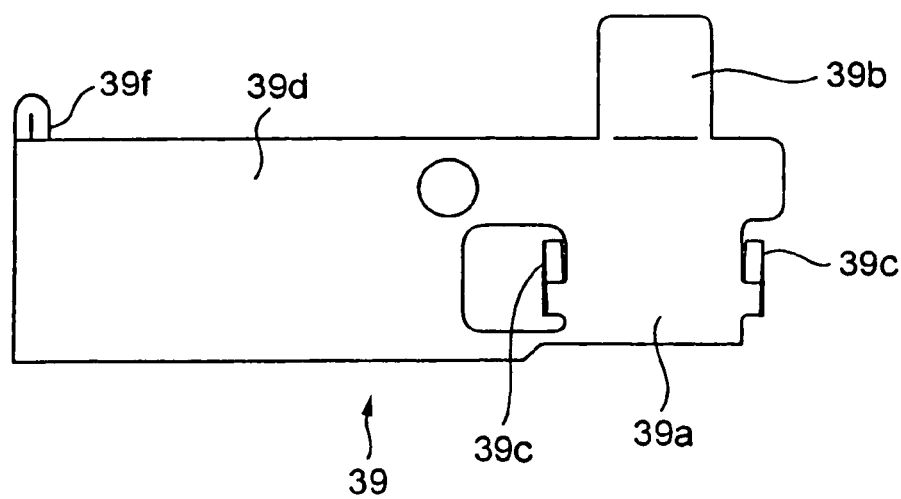
Figure 13A:
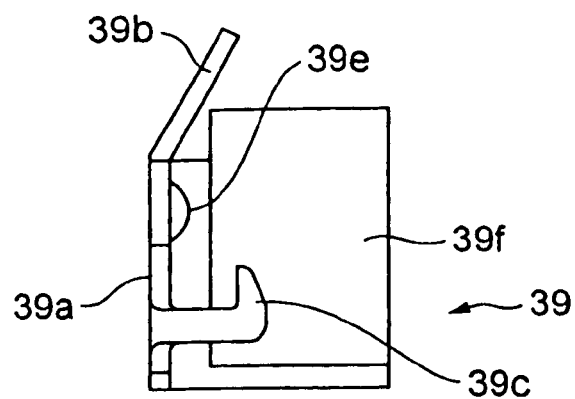
FIG. 13A is a right side view showing the connecting terminal of one brush holder and FIG. 13B is a bottom face view showing the connecting terminal of one brush holder.
Figure 13B:
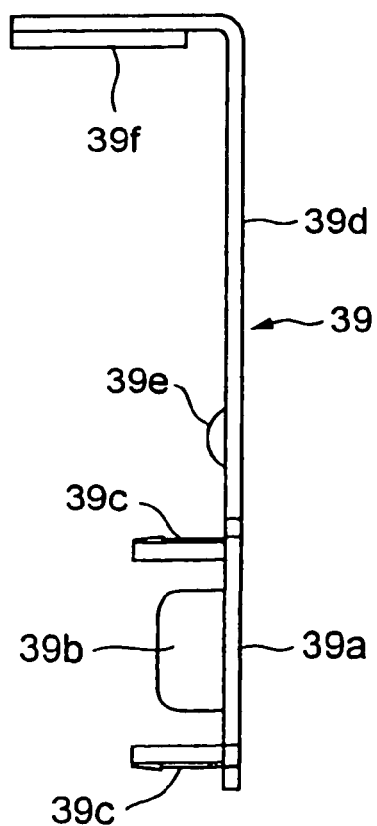
Figure 14A:
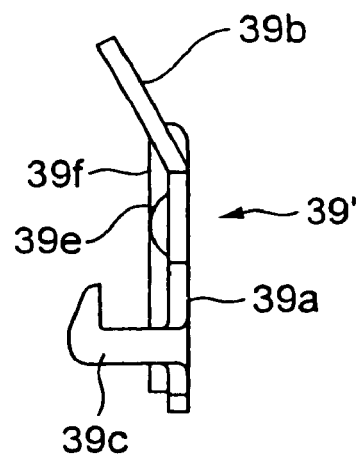
FIG. 14A is a left side view showing a connecting terminal of the other brush holder and FIG. 14B is a plan view showing the connecting terminal of the other brush holder.
Figure 14B:
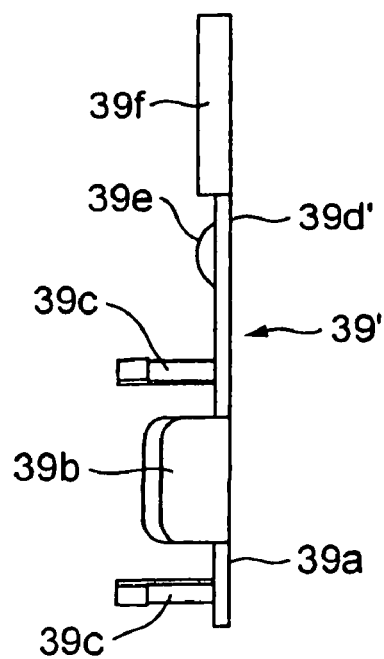
Figure 15A:
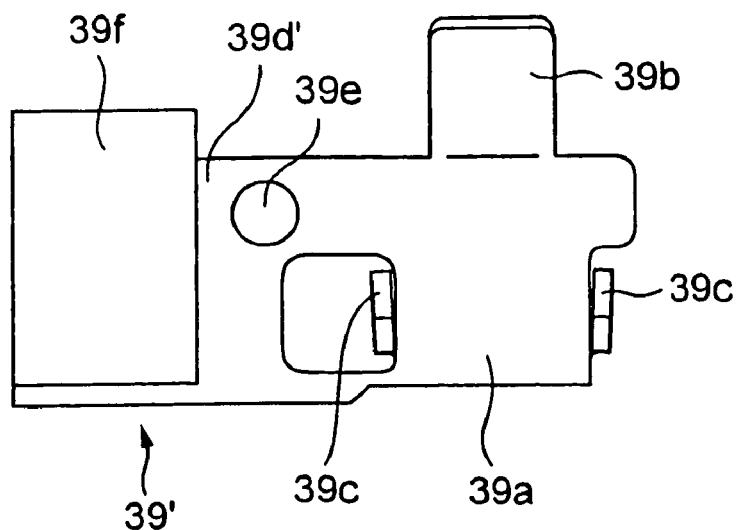
FIG. 15A is a front view showing the connecting terminal of the other brush holder and FIG. 15B is a rear view showing the connecting terminal of the other brush holder.
Figure 15B:
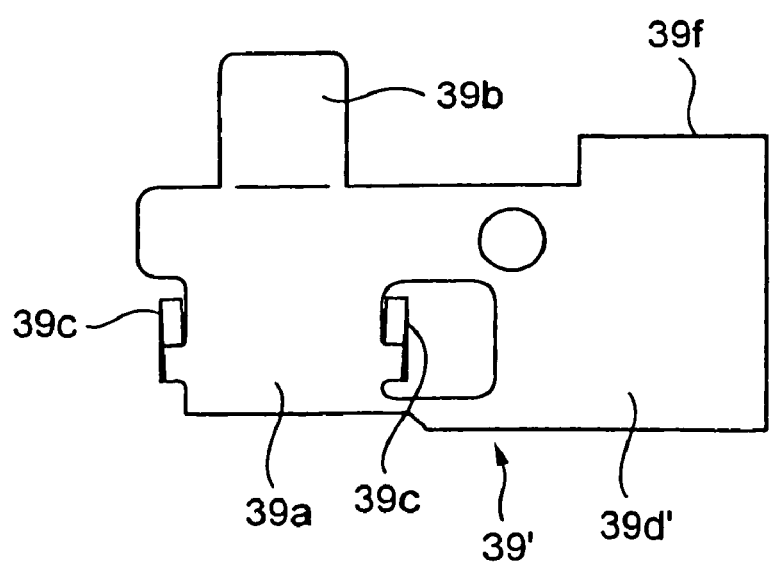
Figure 16A:
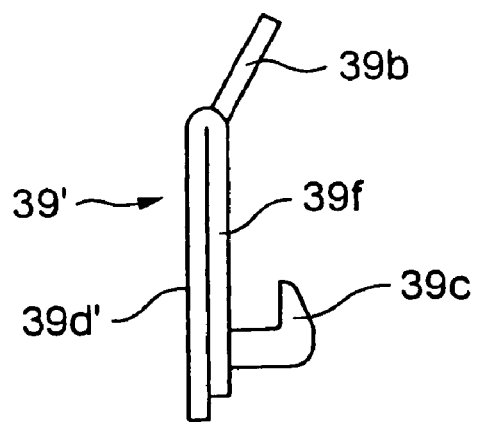
FIG. 16A is a right side view showing the connecting terminal of the other brush holder and FIG. 16B is a bottom face view showing the connecting terminal of the other brush holder.
Figure 16B:
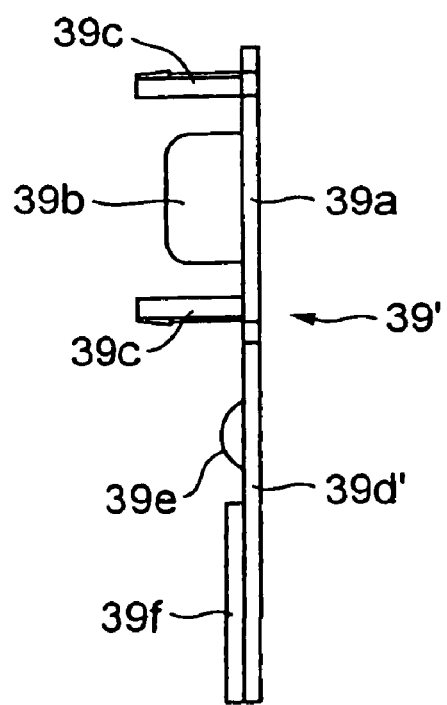
Figure 17:
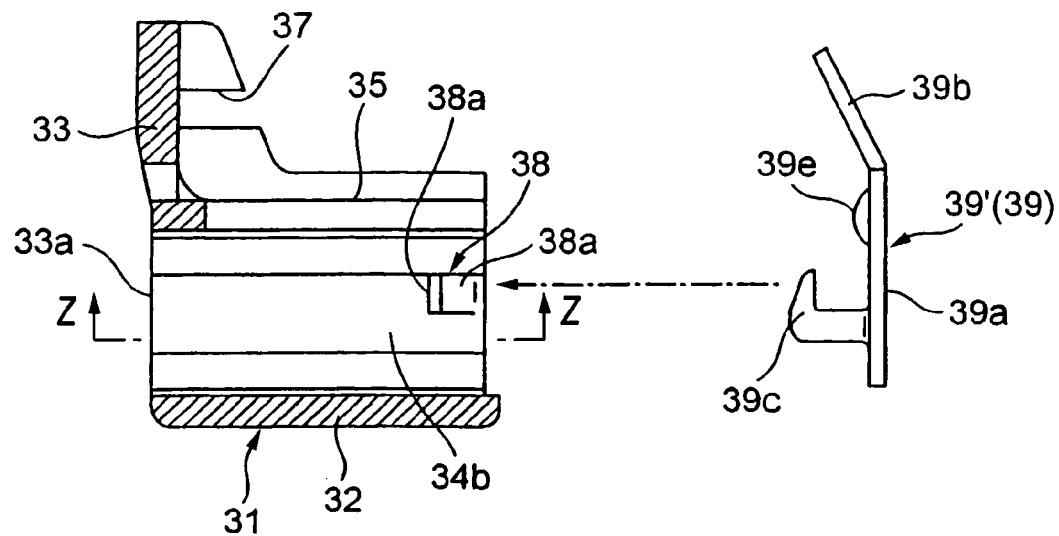
FIG. 17 is a sectional view showing a state before each brush holder body and each connecting terminal are attached.
Figure 18:
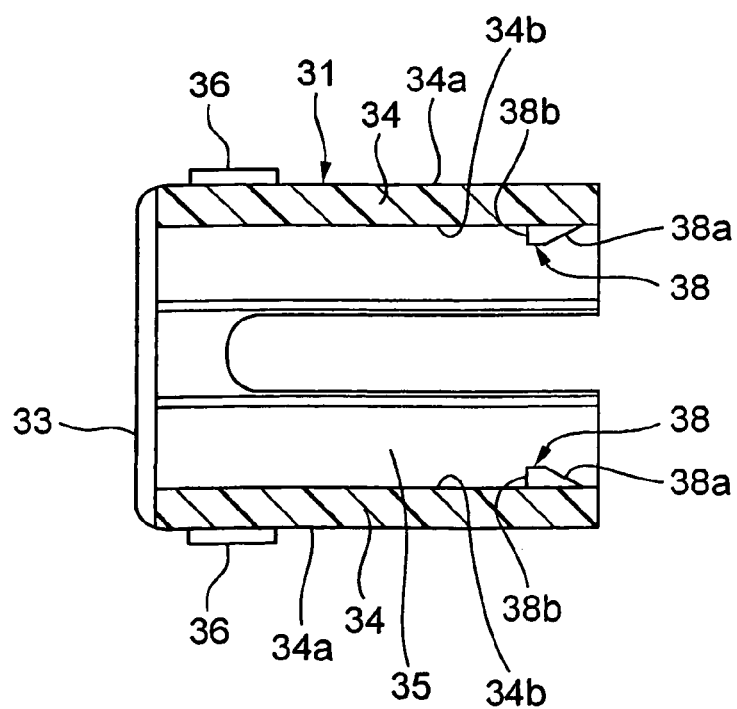
FIG. 18 is a sectional view taken on line Z-Z in FIG. 17.
Figure 19:
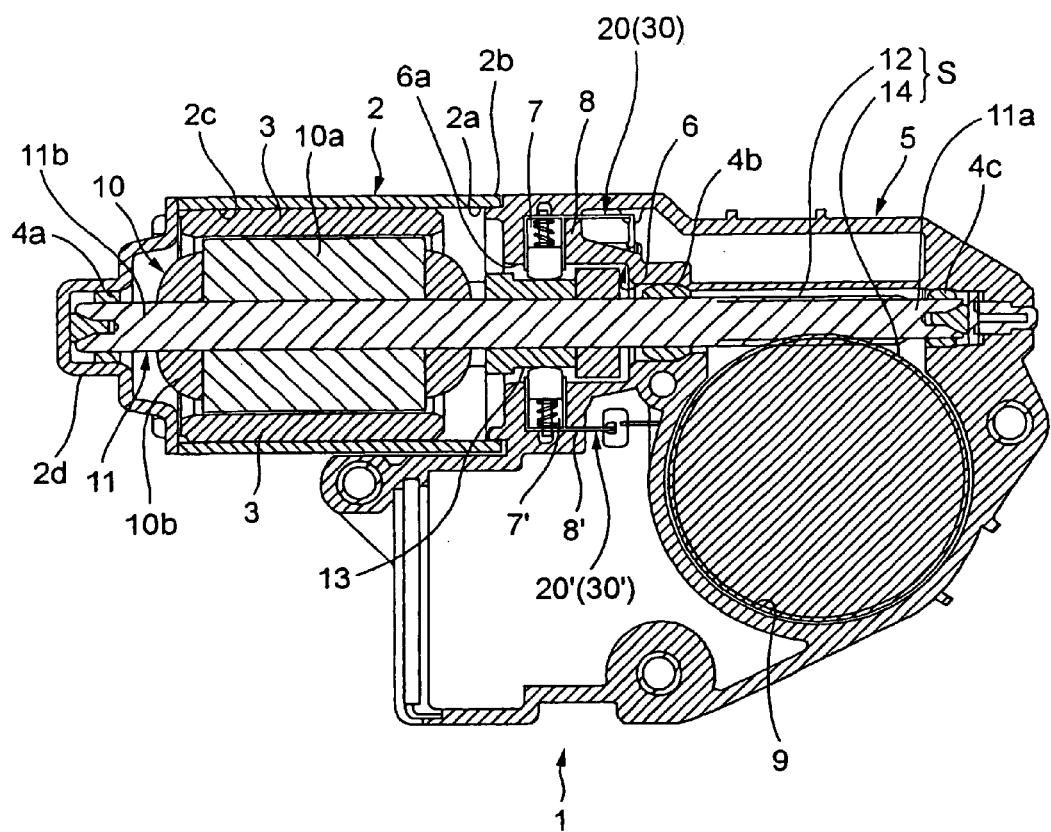
FIG. 19 is a lateral sectional view showing an outline of a miniature motor.
Figure 20:
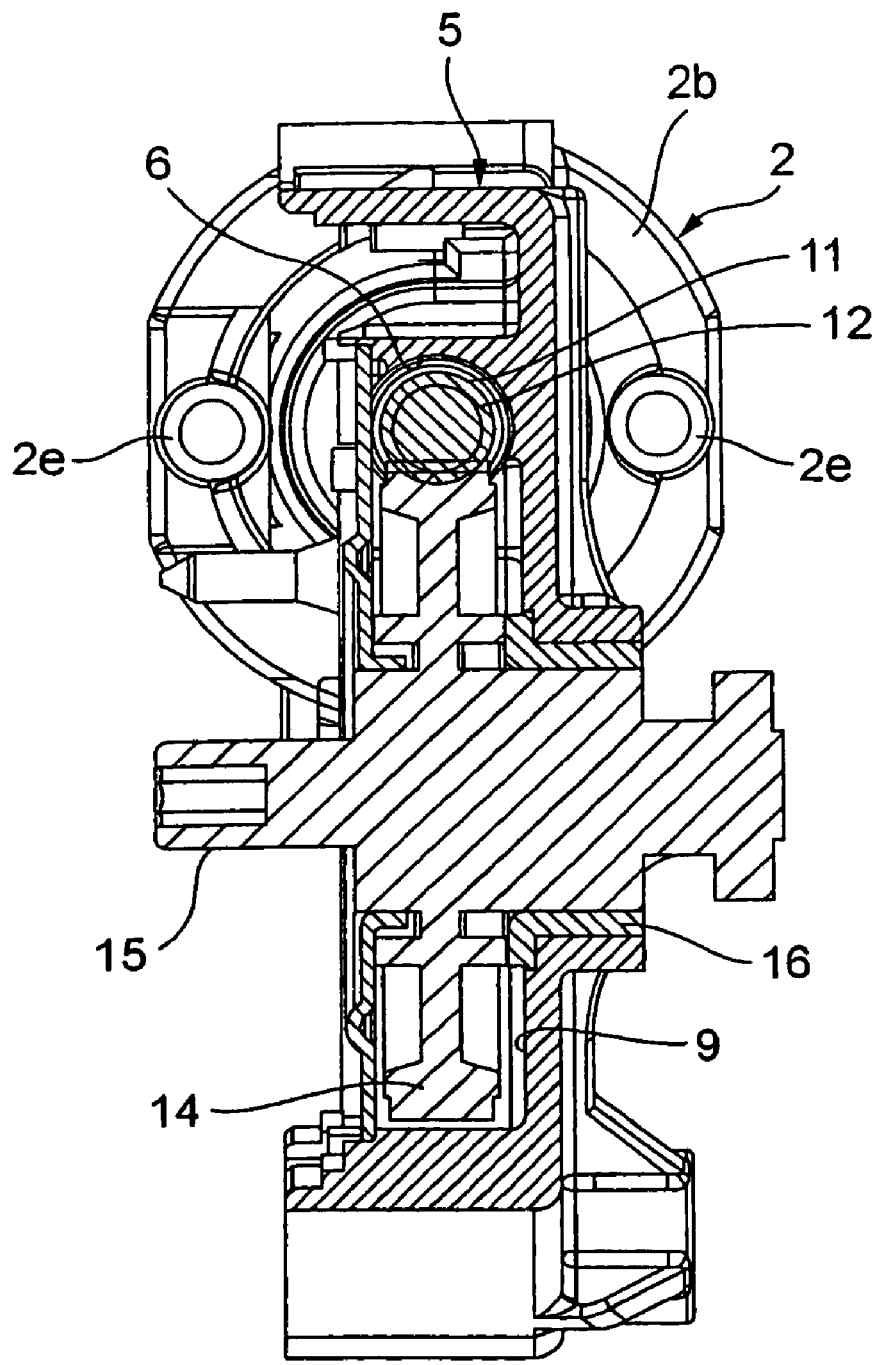
FIG. 20 is a longitudinal sectional view showing a wheel gear of the miniature motor.
Figure 21:
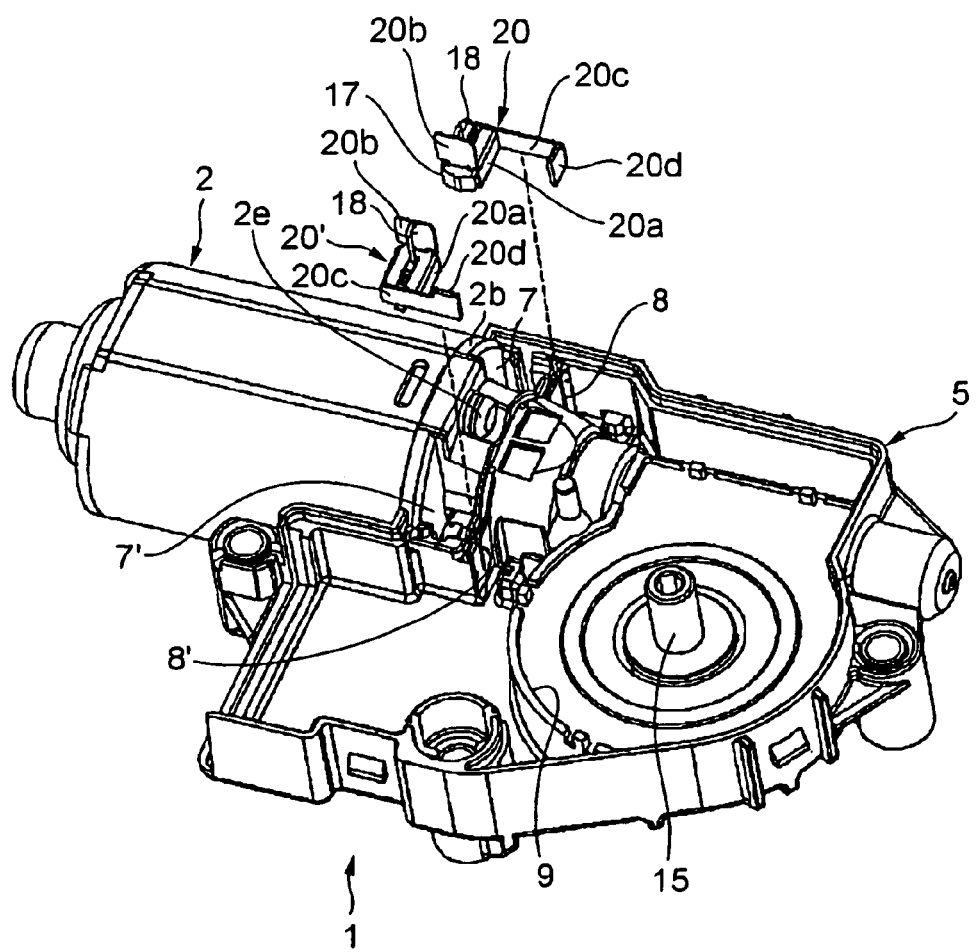
FIG. 21 is a perspective view for explaining a relation of attaching a pair of brush holders to a conventional miniature motor.
Figure 22:
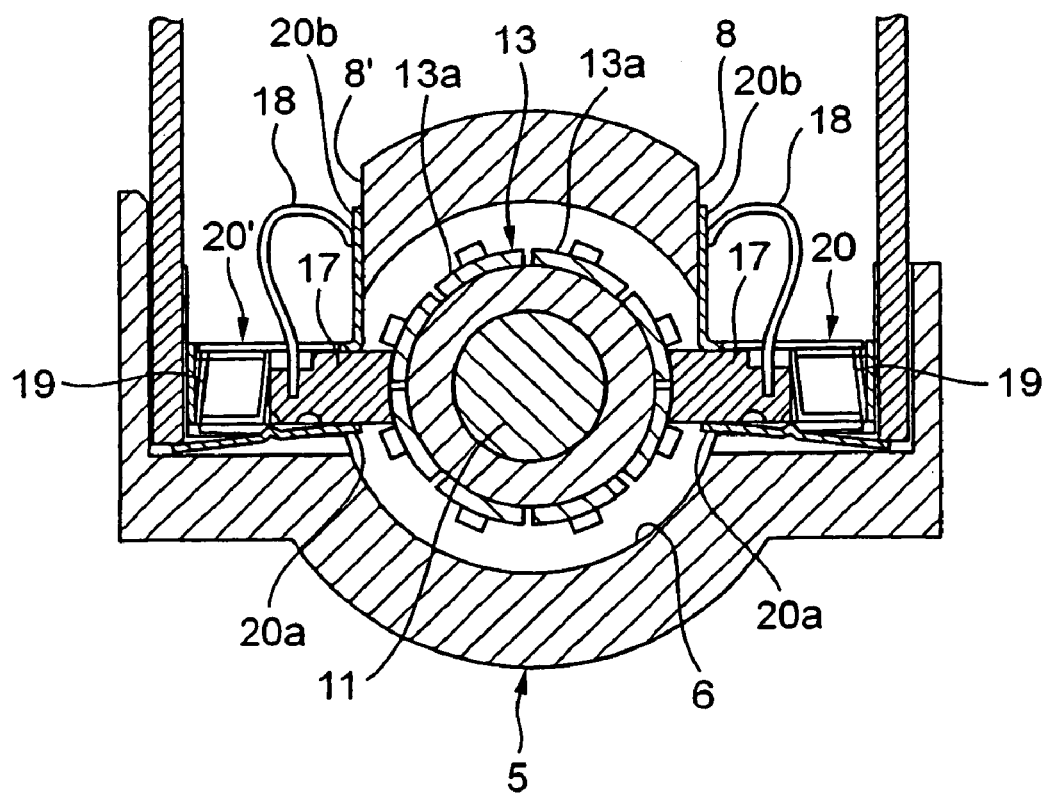
FIG. 22 is a longitudinal sectional view showing a primary portion of the conventional miniature motor.
Figure 23:
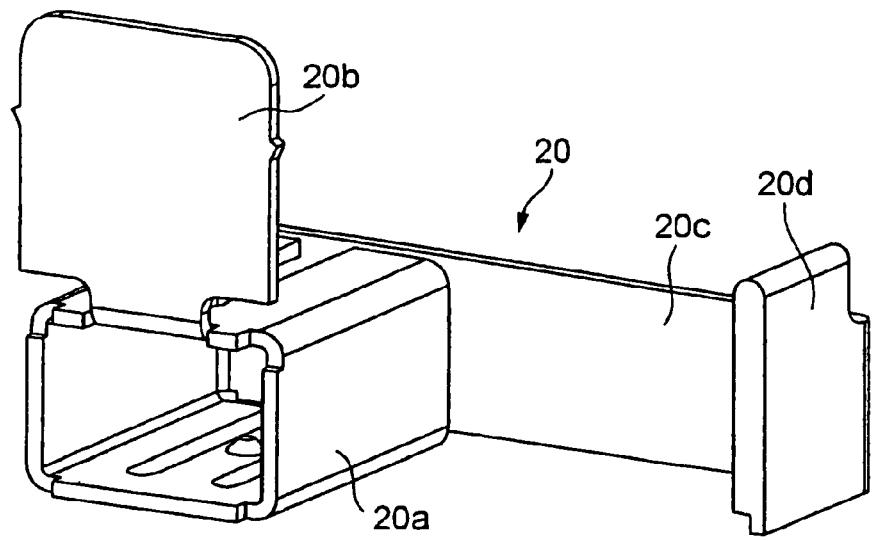
FIG. 23 is a perspective view of one brush holder used for the conventional miniature motor, wherein the view is obliquely taken from an upper portion.
Figure 24:
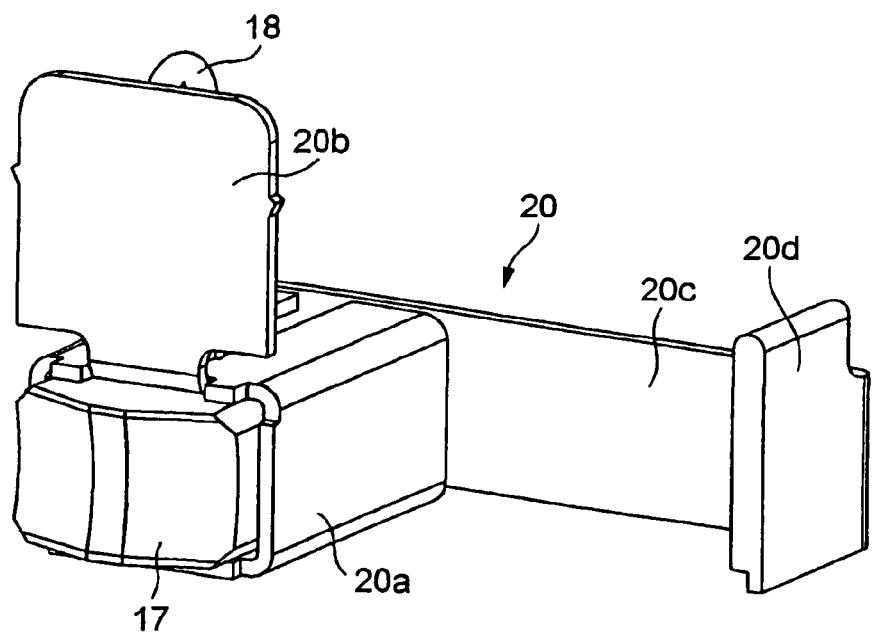
FIG. 24 is a perspective view showing a state in which the brush of one brush holder used for the conventional miniature motor is held, wherein the view is obliquely taken from an upper portion.
Figure 25:
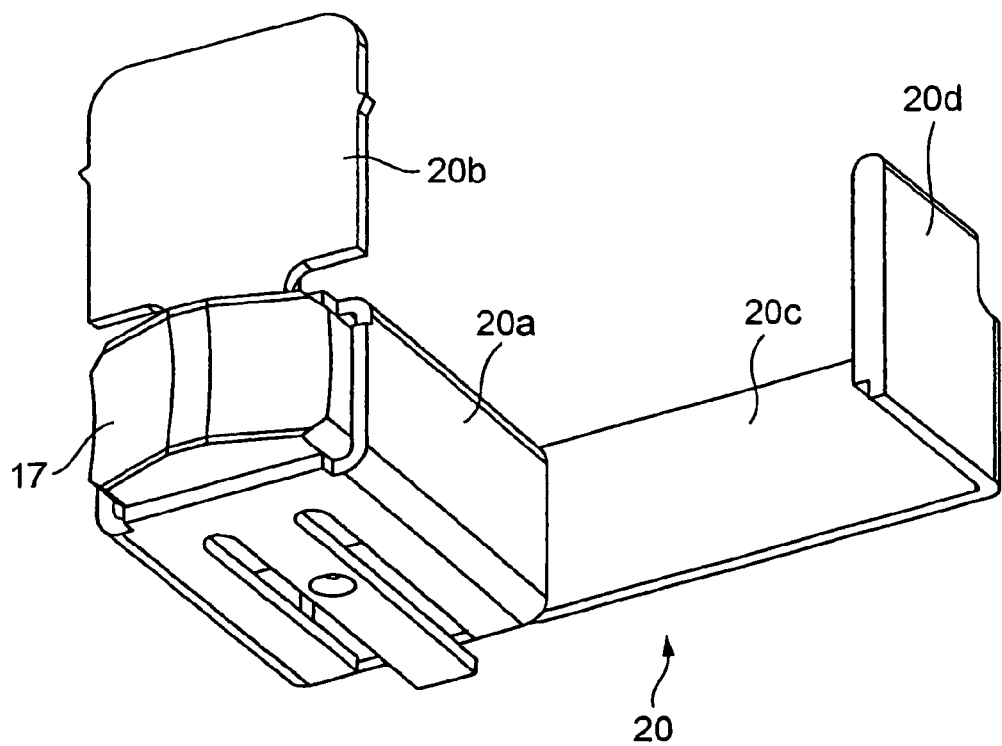
FIG. 25 is a perspective view showing a state in which the brush of one brush holder used for the conventional miniature motor is held, wherein the view is obliquely taken from a lower portion.
Figure 26:
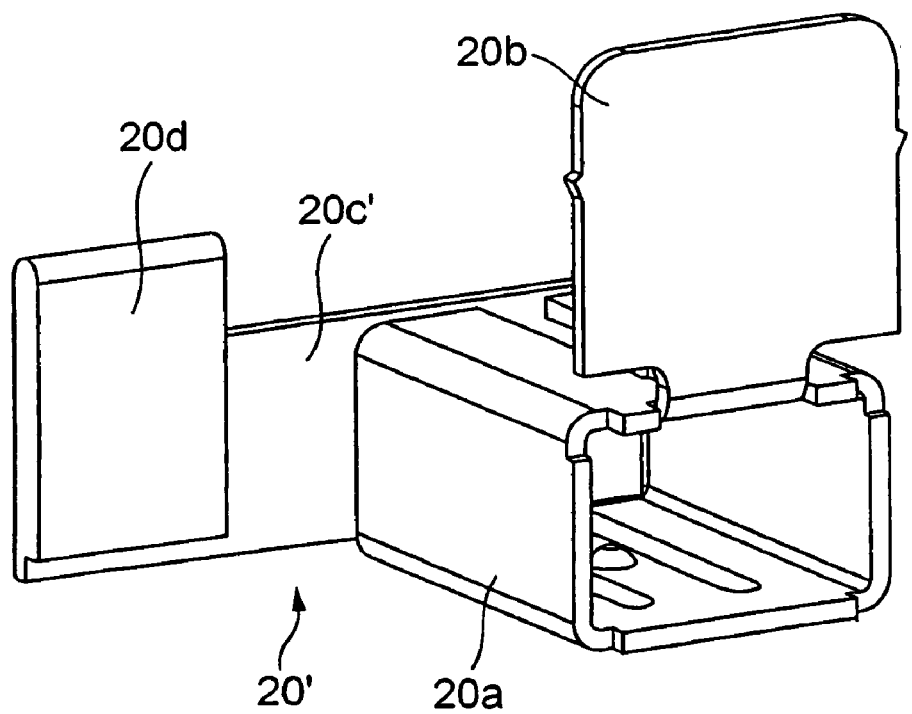
FIG. 26 is a perspective view showing a state in which the other brush holder used for the conventional miniature motor is held, wherein the view is obliquely taken from an upper portion.
Figure 27:
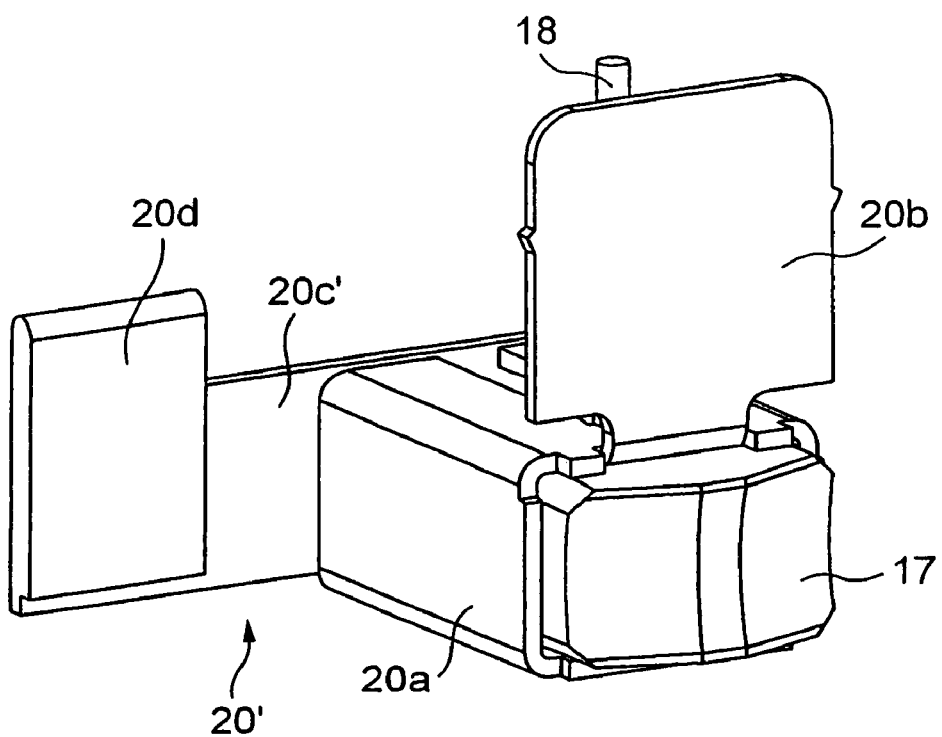
FIG. 27 is a perspective view showing a state in which the brush of the other brush holder used for the conventional miniature motor is held, wherein the view is obliquely taken from an upper portion.
Figure 28:
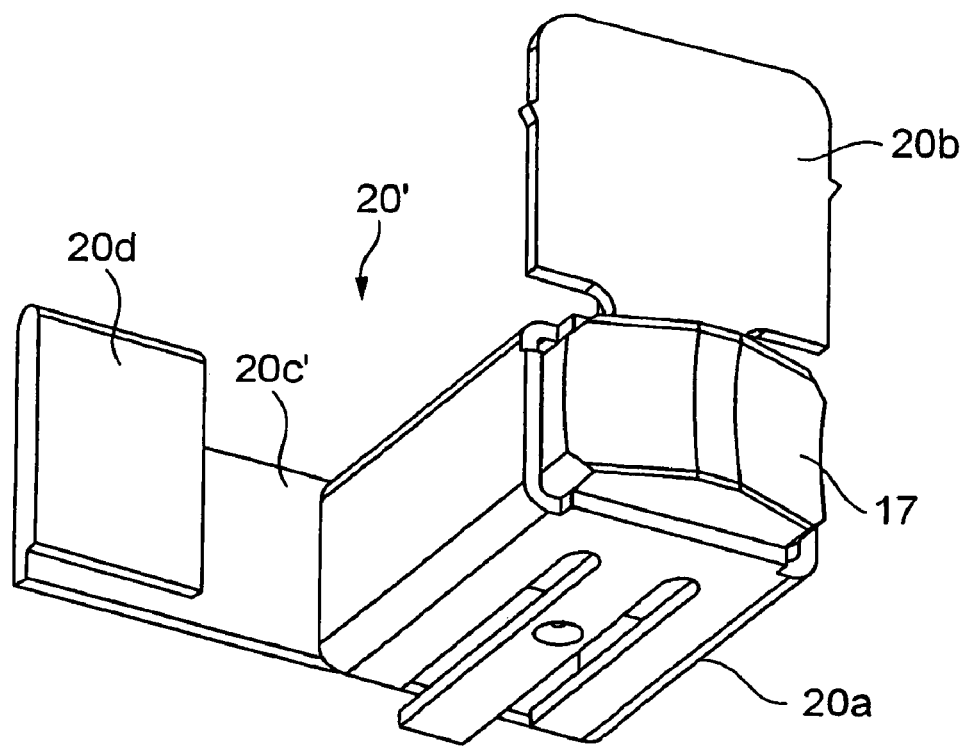
FIG. 28 is a perspective view showing a state in which the brush of the other brush holder used for the conventional miniature motor is held, wherein the view is obliquely taken from a lower portion.

FIG. 1 is a plan view showing a gear case of a miniature motor of an embodiment of the present invention, FIG. 2 is an enlarged plan view showing the portion X in FIG. 1, FIG. 3 is a sectional view taken on line Y-Y in FIG. 1, FIG. 4A is a left side view showing a state in which a brush of one brush holder used for the miniature motor is held, FIG. 4B is a plan view showing the state, FIG. 5A is a front view showing the state, FIG. 5B is a rear view showing the state, FIG. 6A is a left side view showing a state in which a brush of the other brush holder used for the miniature motor is held, FIG. 6B is a plan view showing the state, FIG. 7A is a front view showing the state, FIG. 7B is a rear view showing the state, FIG. 8A is a left side view showing a brush holder body of the brush holder, FIG. 8B is a plan view showing the brush holder body, FIG. 9A is a front view of the brush holder body, FIG. 9B is a rear view of the brush holder body, FIG. 10A is a right side view of the brush holder body, FIG. 10B is a bottom face view of the brush holder body, FIG. 11A is a left side view of a connecting terminal of one of the brush holders, FIG. 11B is a plan view of a connecting terminal of the other brush holder, FIG. 12A is a front view of the connecting terminal of one brush holder, FIG. 12B is a rear view of the connecting terminal of one brush holder, FIG. 13A is a right side view showing a connecting terminal of one brush holder, FIG. 13B is a bottom face view showing a connecting terminal of one brush holder, FIG. 14A is a left side view showing a connecting terminal of the other brush holder, FIG. 14B is a plan view showing a connecting terminal of the other brush holder, FIG. 15A is a front view showing a connecting terminal of the other brush holder, FIG. 15B is a rear view showing a connecting terminal of the other brush holder, FIG. 16A is a right side view showing a connecting terminal of the other brush holder, FIG. 16B is a bottom face view showing a connecting terminal of the other brush holder, FIG. 17 is a sectional view showing a state before the brush holder and the connecting terminal are attached to each other, and FIG. 18 is a sectional view taken on line Z-Z in FIG. 17. In this connection, the miniature motor 1 shown in FIGS. 19 and 20 is quoted to this embodiment.

As shown in FIGS. 1 to 3 and FIGS. 19 and 20, the miniature motor 1 includes: a yoke (motor case) 2 made of metal, which formed into a substantial cylinder, for housing the armature 10 which is rotated when it is energized; a gear case 5 made of synthetic resin and fastened and fixed to the flange portion 2b of this yoke 2 with the screws 2e, the gear case 5 pivotally supporting the output shaft 15 to which the rotation of the armature 10 is transmitted via the reduction gear mechanism S; and a pair of brush holders 30, 30' for holding the brushes 17, which energize the commutator 13 attached to the armature shaft 11 of the armature 10, the brush holders 30, 30' being press-fitted into the recess-shaped brush holder attaching portions 7, 7' formed in the gear case 5 and also press-fitted into the cutout portions 8, 8' in the axial direction of the output shaft 15.

As shown in FIGS. 1 to 5, one brush holder 30 in the pair of brush holders 30, 30' includes: a substantially box-shaped brush holder body 31 made of synthetic resin which houses the brush 17 and is press-fitted into the recess-shaped brush holder attaching portion 7 of the gear case 5; and a metallic-plate-shaped connecting terminal 39 detachably attached so that it can cover the rear side opening portion of this brush holder body 31, to which the pigtail 18 formed integrally with the brush 17 is connected.

As shown in FIGS. 1 to 5, FIGS. 6 to 10 and FIGS. 17 and 18, the brush holder body 31 includes: a bottom wall 32; a front wall 33, which vertically rises from the front end of this bottom wall 32, having a rectangular opening portion 33a at the center on the lower side; a pair of side walls 34, 34 which are opposed to each other, vertically rising from both side end portions of the bottom wall 32; and an intermediate wall 35, which is formed into a flat U-shape, extending horizontally between a pair of side walls 34, 34 at the rear with respect to the substantial center of the front wall 33. The brush holder body 31 is formed into a substantial box-shape by these components. The brush 17 is slidably accommodated among the bottom wall 32, the pair of side walls 34, 34 and the intermediate wall 35 of the brush holder body 31. Further, as shown in FIG. 3, the brush 17, which is exposed outside from the opening portion 33a of the front wall 33 of the brush holder body 31, is pushed by the compressive coil spring 19 so that the brush 17 can be contacted with the commutator 13.

On the upper side of each outer face 34a of a pair of side walls 34, 34 of the brush holder body 31, the protrusion 36 used for press-fitting into the recess-shaped brush holder attaching portion 7 is integrally protruded so that it can be horizontally extended. On the lower side of each protrusion 36 of the pair of side walls 34, 34 of the brush holder body 31, the rectangular slit 37 is formed. Further, as shown in FIGS. 17 and 18, on each inner face 34b of the pair of side walls 34, 34 of the brush holder body 34, the engaging protrusion 38 is integrally protruded. Each engaging protrusion 38 has an inclined face 38a and an engaging face 38b.

As shown in FIGS. 1 to 5, FIGS. 11 to 13 and FIG. 17, the connecting terminal 39 includes: a substantially rectangular-plate-shaped terminal body 39a which is formed by bending the first connecting piece portion 39b to which the pigtail 18, which is formed integrally with the brush 17, is connected by means of deposition, and which is formed by bending a pair of L-shaped hook portions 39c, 39c engaged with the engaging protrusion 38 of the brush holder body 31; and an extending portion 39d integrally formed in one side portion of the terminal body 39a so that it can be extended outside from the brush holder body 31. The extending portion 39d of the connecting terminal 39 is inserted into the cutout portion 8 provided in the recess-shaped brush holder attaching portion 7. At the position of the extending portion 39d of the connecting terminal 39 opposing to the cutout portion 8, the protrusion 39e used for press-fitting into the cutout portion 8 is integrally formed. Further, at the forward end portion of the extending portion 39d of the connecting terminal 39, the second connecting piece 39f, which is vertically folded double, is formed. After the extending portion 39d of the connecting terminal 39 is attached to the cutout portion 8, the second connecting piece 39f is connected to the control circuit not shown on the circuit board 40.

As shown in FIGS. 1 to 3 and FIGS. 6 and 7, the other brush holder 30' of the pair of brush holders 30, 30' includes: a substantially box-shaped brush holder body 31 made of synthetic resin for housing the brush 17, press-fitted into the recess-shaped brush holder attaching portion 7' of the gear case 5; and a metallic-plate-shaped connecting terminal 39' detachably attached to the brush holder body 31 so that the connecting terminal 39' can cover a rear opening portion of the brush holder body 31 and connected with the pigtail 18 formed integrally with the brush 17.

As shown in FIGS. 1 to 3 and FIGS. 6 to 10, the brush holder body 31 of the other brush holder 30' is the same as the brush holder body 31 of one brush holder 30. The brush holder body 31 of the other brush holder 30' includes: a bottom wall 32; a front wall 33, which vertically rises from the front end of this bottom wall 32, having a rectangular opening portion 33a at the center on the lower side; a pair of side walls 34, 34 which are opposed to each other, vertically rising from both side end portions of the bottom wall 32; and an intermediate wall 35, which is formed into a flat U-shape, extending horizontally between a pair of side walls 34, 34 at the rear with respect to the substantial center of the front wall 33. The brush holder body 31 is formed into a substantial box-shape by these components. The brush 17 is slidably housed among the bottom wall 32, the pair of side walls 34, 34 and the intermediate wall 35 of the brush holder body 31. Further, as shown in FIG. 2, the brush 17, which is exposed outside from the opening portion 33a of the front wall 33 of the brush holder body 31, is pushed by the compressive coil spring 19 so that the brush 17 can be contacted with the commutator 13.

On the upper side of each outer face 34a of a pair of side walls 34, 34 of the brush holder body 31, the protrusion 36 used for press-fitting into the recess-shaped brush holder attaching portion 7 is integrally protruded so that it can be horizontally extended. On the lower side of each protrusion 36 of the pair of side walls 34, 34 of the brush holder body 31, the rectangular slit 37 is formed. Further, as shown in FIGS. 17 and 18, on each inner face 34b of the pair of side walls 34, 34 of the brush holder body 31, the engaging protrusion 38 is integrally protruded. Each engaging protrusion 38 has an inclined face 38a and an engaging face 38b.

As shown in FIGS. 1 to 3, FIGS. 6 and 7 and FIGS. 14 to 17, the connecting terminal 39' includes: a substantially rectangular-plate-shaped terminal body 39a which is formed by bending the first connecting piece portion 39b to which the pigtail 18, which is formed integrally with the brush 17, is connected by means of deposition, and which is formed by bending a pair of L-shaped hook portions 39c, 39c engaged with the engaging protrusion 38 of the brush holder body 31; and an extending portion 39d' integrally formed in one side portion of the terminal body 39a so that it can be extended outside from the brush holder body 31. The extending portion 39d' of this connecting terminal 39' is shorter than the extending portion 39d of the connecting terminal 39 of one brush holder 30 and inserted into the cutout portion 8' provided in the recess-shaped brush holder attaching portion 7'. At the position opposed to the cutout portion 8' of the extending portion 39d' of the connecting terminal 39', the protrusion 39e used for press-fitting into the cutout portion 8' concerned is integrally formed. Further, at the forward end portion of the extending portion 39d' of the connecting terminal 39', the second connecting piece portion 39f, which is folded, is formed. After the extending portion 39d' of the connecting terminal 39, is attached to the cutout portion 8', this second connecting piece 39f is connected to a control circuit not shown provided in the circuit board 40.

According to the miniature motor 1 of this embodiment, a pair of brush holders 30, 30' accommodate the brush 17. The pair of brush holders 30, 30' includes: substantially box-shaped brush holder bodies 31, 31 made of synthetic resin press-fitted into the recess-shaped brush holder attaching portions 7, 7' of the gear case 5; and metallic-plate-shaped connecting terminals 39, 39' which are detachably attached so that the connecting terminals 39, 39' can cover the rear side opening portions of the brush holder bodies 31, 31, to which the pigtail 18 formed integrally with the brush 17 is connected. When the protrusions 36 used for press-fitting are respectively protruded from the outer faces 34a of the pair of side walls 34, 34 opposed to each other of the brush holder body 31, the substantially box-shaped brush holder bodies 31, 31 made of synthetic resin can be positively and simply attached via the protrusions 36 on the pair of side walls 34, 34 of the recess-shaped brush holder attaching portions 7, 7' of the gear case 5 without causing any rattling. Accordingly, the generation of operational noise can be positively prevented.

Especially when the protrusions 36 used for press-fitting are respectively formed on the upper side of the brush 17 on the outer faces 34a of the pair of side walls 34, 34 opposed to each other of each brush holder body 31 and when the slits 37 are formed on the lower side of the protrusions 36 on the side walls 34, each brush holder body 31 can be positively press-fitted into the recess-shaped brush holder attaching portion 7, 7'. Since the slit 37 can positively absorb the deformation of each brush holder body 31 generated at the time of press-fitting, the brush 17 accommodated in each brush holder body 31 is not given an excessively heavy load.

When the engaging protrusions 38 are integrally protruded from the inner faces 34b of the pair of side walls 34, 34 opposed to each other of the brush holder body 31 and a pair of hook portions 39c, 39c engaged with the engaging protrusions 38 are protruded from the connecting terminals 39, 39' opposed to the engaging protrusions 38, the connecting terminals 39, 39' can be simply and positively attached to between the pair of side walls 34, 34 of the brush holder body 31.

Further, when the extending portions 39d, 39d' extending outside the brush holder body 31 are provided in one side portions of the connecting terminals 39, 39' and the extending portions 39d, 39d' are freely inserted into the cutout portions 8, 8' provided in the recess-shaped brush holder attaching portions 7, 7' and the protrusions 39e used for press-fitting are formed at the positions opposed to the cutout portions 8, 8' of the extending portions 39d, 39d', the extending portions 39d, 39d' of the connecting terminals 39, 39' can be press-fitted into the cutout portions 8, 8' without causing any rattling. Therefore, the generation of vibration can be positively prevented.

As described above, the pair of brush holders 30, 30' are formed being divided into the substantially box-shaped brush holder bodies 31, 31 made of synthetic resin and the metallic-plate-shaped connecting terminals 39, 39' attached to the rear side opening portion of the brush holder bodies 31, 31. Due to this structure, as compared with the conventional brush holders 20, 20' which are entirely made of metal, the weight of the entire miniature motor 1 can be reduced and the manufacturing cost can be decreased.

What is claimed is:

1. A miniature motor comprising:
a motor case in which an armature rotated by energizing is housed;
a gear case connected to the motor case, for pivotally supporting an output shaft to which a rotation of the armature is transmitted via a reduction gear mechanism;
a brush holder for holding a brush to energize a commutator attached to an armature shaft of the armature, attached to the gear case; and
a brush holder attaching portion, which comprises a recess-shape, into which the brush holder is press-fitted in an axial direction of the output shaft, the brush holder attaching portion is formed integrally with the gear case,
wherein the brush holder comprises:
a substantially box-shaped brush holder body that comprises a synthetic resin for housing the brush, the brush holder body is press-fitted into the brush holder attaching portion which comprises a recess-shape; and
a metallic-plate-shaped connecting terminal detachably attached to the brush holder body so that the connecting terminal covers a rear opening portion of the brush holder body and connects with a pigtail formed integrally with the brush,
wherein a protrusion press-fits the brush holder into the brush holder attaching portion, and
wherein the protrusion is integrally formed on each of a pair of side walls of the brush holder body which are opposed to each other.

2. The miniature motor according to claim 1, wherein the protrusion used for press-fitting into the brush holder attaching portion is integrally formed on each outer face of the pair of side walls of the brush holder body, which are opposed to each other, on an upper side of the brush, and
wherein a slit is formed on the lower side of the protrusion of each of the side walls.

3. The miniature motor according to claim 1, wherein an engaging protrusion is integrally formed on each inner face of the pair of side walls of the brush holder body which are opposed to each other, and
wherein a hook portion engaged with each engaging protrusion is formed in the connecting terminal opposed to each engaging protrusion.

4. The miniature motor according to claim 1, wherein an extending portion extending outside with respect to the brush holder body is provided in one side portion of the connecting terminal,
wherein the extending portion is freely insertable into a cutout portion provided in the brush holder attaching portion which is formed into a recess shape, and
wherein a protrusion used for press-fitting into the cutout portion is formed at a position opposing to the cutout portion in the extending portion.

5. The miniature motor according to claim 1, wherein the protrusion used for press-fitting into the brush holder attaching portion is integrally formed on each outer face of the pair of side walls of the brush holder body, which are opposed to each other, on an upper side of the brush.

6. The miniature motor according to claim 1, wherein a slit is formed on the lower side of the protrusion of each of the side walls.

7. The miniature motor according to claim 1, wherein an engaging protrusion is integrally formed on each inner face of the pair of side walls of the brush holder body which are opposed to each other.

8. The miniature motor according to claim 1, wherein a hook portion engaged with an engaging protrusion is formed in the connecting terminal opposed to each engaging protrusion.

9. The miniature motor according to claim 1, wherein an extending portion extending outside of the brush holder body is provided in a side portion of the connecting terminal.

10. The miniature motor according to claim 9, wherein the extending portion is freely insertable into a cutout portion provided in the brush holder attaching portion which comprises a recess shape.

11. The miniature motor according to claim 9, wherein a protrusion used for press-fitting into a cutout portion is formed at a position opposing to the cutout portion in the extending portion.

12. The miniature motor according to claim 1, wherein the brush holder body is positively press-fitted into the recess-shaped brush holder attaching portion.

13. The miniature motor according to claim 2, wherein the slit positively absorbs a deformation of the brush holder body generated at a time of press-fitting.

14. The miniature motor according to claim 1, wherein the connecting terminal is positively attached to the pair of side walls of the brush holder body.

15. The miniature motor according to claim 1, wherein an extending portion of the connecting terminal is press-fitted into a cutout portion provided in the brush holder attaching portion.

16. The miniature motor according to claim 1, wherein the gear case comprises a synthetic resin.

17. The miniature motor according to claim 1, wherein the brush holder body comprises:
- a bottom wall;
- a front wall, which vertically rises from a front end of the bottom wall, having a rectangular opening portion at a center on a lower side;
- a pair of side walls which are opposed to each other, vertically rising from side end portions of the bottom wall; and
- an intermediate wall, which comprises a flat U-shape, extending horizontally between a pair of side walls at a rear with respect to a substantial center of the front wall.

18. The miniature motor according to claim 7, wherein said engaging protrusion comprises:
- an inclined face; and
- an engaging face.

19. The miniature motor according to claim 1, wherein the connecting terminal comprises a vertically folded double connecting piece.

20. A miniature motor comprising:
- a motor case, which comprises a synthetic resin, and houses an armature;
- a brush holder for holding a brush to energize a commutator attached to the armature; and
- a brush holder attaching portion, which comprises a recess-shape into which the brush holder is press-fitted in the axial direction of the output shaft, the brush holder comprising:
  - a substantially box-shaped brush holder body, comprising a synthetic resin for housing the brush, the brush holder body is press-fitted into the brush holder attaching portion which comprises a recess-shape; and
  - a metallic-plate-shaped connecting terminal detachably attached to the brush holder body so that the connecting terminal covers a rear opening portion of the brush holder body and connects with a pigtail formed integrally with the brush,
- wherein a protrusion press-fits the brush holder into the brush holder attaching portion,
- wherein the protrusion is integrally formed on each of a pair of side walls of the brush holder body which are opposed to each other,
- wherein a slit is formed on the lower side of the protrusion of each of the side walls, and
- an engaging protrusion is integrally formed on each inner face of the pair of side walls of the brush holder body which are opposed to each other.

* * * * *